May 16, 1933. W. H. CREEL 1,908,733
COOLING AND CONDENSING APPARATUS
Filed Dec. 27, 1932 2 Sheets-Sheet 1
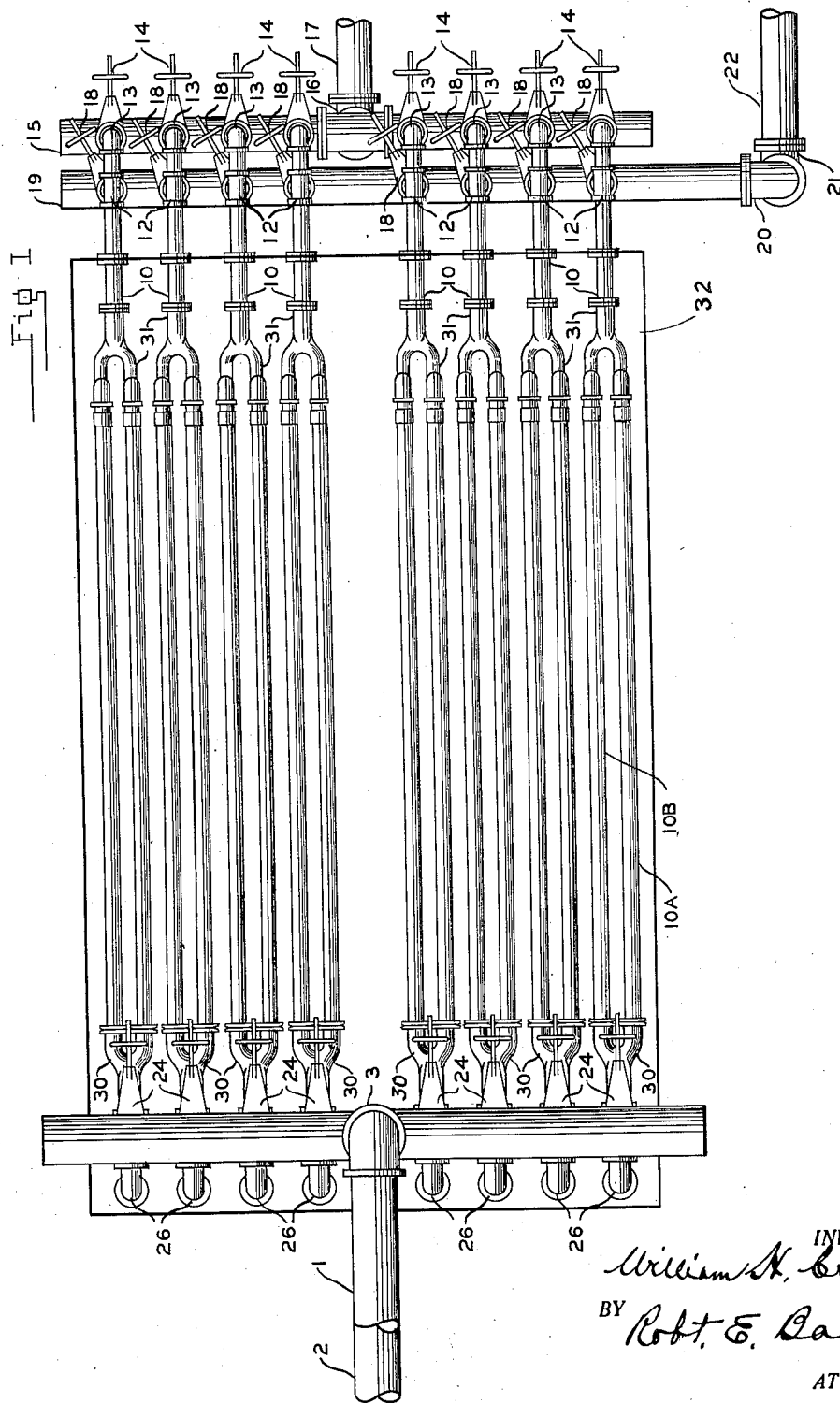

May 16, 1933.  W. H. CREEL  1,908,733
COOLING AND CONDENSING APPARATUS
Filed Dec. 27, 1932   2 Sheets-Sheet 2
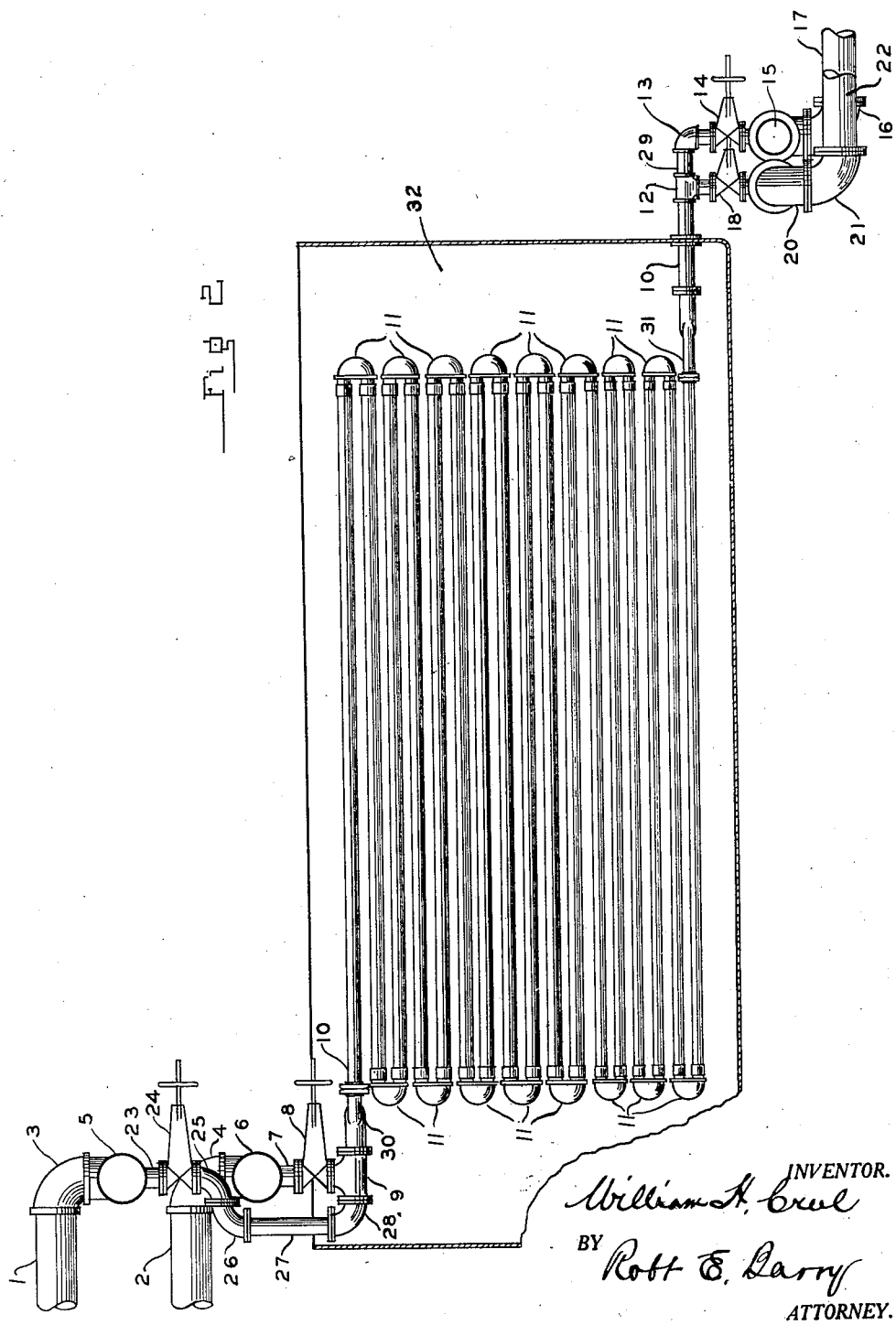

Patented May 16, 1933

1,908,733

UNITED STATES PATENT OFFICE

WILLIAM H. CREEL, OF BARTLESVILLE, OKLAHOMA, ASSIGNOR TO PHILLIPS PETROLEUM COMPANY, OF BARTLESVILLE, OKLAHOMA, A CORPORATION OF DELAWARE

COOLING AND CONDENSING APPARATUS

Application filed December 27, 1932. Serial No. 649,099.

This invention relates to an improved condenser or cooler for use in condensing or cooling various kinds of vapors and cooling liquids, and is particularly useful in condensing and/or cooling petroleum vapors and cooling petroleum liquids.

An object of this invention is to provide a means for simultaneously condensing or cooling a plurality of fractions in the same condensing device without intermingling said fractions.

It is particularly advantageous in such cases as when gasoline vapors are passed through treating steps prior to condensation, and it is desired to separately condense the treated vapors and vapors which are to be returned as reflux to a fractionating device, and which are not passed through the treating steps.

In such procedure, it would, ordinarily, be necessary to build two equally large condenser coils, each capable of condensing the entire mass of vapors leaving the fractionating device, for if it became necessary, by reason, for example, of temperature conditions in the fractionating device, to return almost all of the total condensate as reflux, the reflux condenser would need to be of such size as to condense almost all of the vapors. If an opposite condition prevailed, then it would be necessary for the final condenser also to be large enough to condense almost all the vapors. On the other hand, my invention permits me to build a single condenser merely large enough to condense the total mass of vapors and by means of the novel arrangement I employ, I am enabled to divide the mass so as to handle both the treated and reflux vapors, regardless of their proportions with respect to the total mass of vapors or to each other, since their sum will always be equal to the total mass of vapors leaving the fractionating device. In this way, I can materially reduce the cost of condensing equipment and introduce great flexibility so that I can handle treated and untreated vapors in the same piece of equipment without danger of mixing them and altogether in an entirely satisfactory and practical manner.

My invention is also useful in any place where it is desired to condense several fractions with a minimum of equipment and in a minimum amount of space.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a plan view of a preferred form of my apparatus.

Fig. 2 is an elevation of the same apparatus.

Referring to the drawings, 1 and 2 are vapor inlet pipes leading from two sources of vapor, or from a divided single source of vapor, (the number of vapor pipes can of course be extended to include many more than two), and are connected by elbows 3 and 4 respectively, with vapor headers 5 and 6 respectively. From vapor header 6, a multiplicity, in this case eight, of branch lines 7, each having a valve 8, lead to branches of T's 9 connected to a corresponding number of pipes 10, which are in parallel and each of which forms a coil composed of a number of pipes connected in series by end connections 11. Each of these coils leads at its outlet end to one branch of a T 12, another branch of which leads through a pipe 29 to an elbow 13, a valve 14, and into a condensate header 15, from which an elbow 16 leads to a condensate draw-off pipe 17. The third branch of each of the T's 12 leads to a second valve 18, a second condensate header 19, from which elbows 20 and 21 lead to a second condensate draw-off pipe 22. From the vapor header 5, a multiplicity of connections 23, equal in number to the connections 7, leave vapor header 5 and lead through valves 24, elbows 25 and 26, pipes 27, elbows 28 into the outer branches of T's 9, thus tying both vapor headers 5 and 6 into the same group of coils 10. Each of these coils 10 is also connected to condensate header 19 by means of T 12 and valve 18.

Pipes 10 may be divided into parallel conduits 10a and 10b by means of Y connections 30 at the vapor inlet ends, and Y connections 31 at the condensate outlet ends.

The entire group of pipes 10 is submerged in a rectangular box 32 of a conventional type wherein the cooling or condensing medium is applied.

One method of operation of this condensing apparatus is as follows:

When it is desired to condense vapor fractions of equal volume, one of which enters vapor line 1 and the other vapor line 2, half of the valves 24, in this case four, are opened, and the four corresponding valves 8 are closed. This permits the vapors entering vapor line 1 to pass through Y connections 30 into the four sets of parallel coils 10, corresponding to these same valves 24. The vapors pass through the coils 10 and are condensed, and by opening the four corresponding valves 18 and closing the four further corresponding valves 14, the condensate from these four coils 10 will pass through Y connections 31 and enter condensate header 19, and pass out through elbows 20 and 21 into the condensate draw-off 22. At the same time the vapors entering vapor line 2 pass into vapor header 6, and by closing the remaining four valves 24, and opening the corresponding valves 8, these vapors will pass through the other four Y connections 30 into the corresponding sets of parallel coils 10, will be condensed and the condensate will then pass through the corresponding Y connections 31, and by closing the remaining and consequently the corresponding valves 18, and opening the further corresponding valves 14, this condensate will pass to condensate header 15, thence through elbow 16 to condensate draw-off 17.

As another example, if the quantity of treated vapors is three times as great as the quantity of reflux vapors, then it is only necessary to apportion one of the sections 10 to the reflux vapor, and three to the treated vapors, by opening and closing the proper corresponding valves 8 and 24, and 14 and 18.

From the above it can readily be seen that various combinations of valves can be operated to give any desired division of condensing surface, at the same time keeping the different fractions completely separated.

It will be readily apparent that by means of my invention, it is also possible to cool simultaneously and separately two or more liquid streams, or to condense one or more streams of vapors while at the same time cooling one or more streams of liquid, all of these various streams being treated separately and simultaneously. Also, due to the extreme flexibility of my apparatus, any desired apportionment of heat transfer surface to each of these separate operations may be readily made.

It will be understood that I do not intend to limit myself to any one particular combination of valves or coils or headers, or to any one particular form of apparatus whereby the improvements I have described may be accomplished, but intend to include all forms of apparatus which come within the scope of this invention, as set forth in the appended claims.

What I claim and desire to secure by Letters Patent is:

1. An improved condensing apparatus comprising a multiplicity of inlet headers and an equal number of outlet headers connected together by a multiplicity of pipes, each of said pipes having valves interposed therein posterior to said inlet headers and anterior to said outlet headers, said valves being so disposed as to permit fluid to flow from any of said inlet headers through any of said pipes to any of said outlet headers, while at the same time allowing other fluid without admixture with the first mentioned fluid, to flow from another of said inlet headers through others of said pipes to another of said outlet headers.

2. An improved condensing and cooling apparatus comprising a multiplicity of inlet headers and a multiplicity of outlet headers interconnected by a multiplicity of parallel coil pipes, each of said pipes having valves interposed therein posterior to said inlet headers and anterior to said outlet headers, said valves being so disposed as to permit one fluid to flow from one of said inlet headers through any of said pipes to one of said outlet headers while at the same time permitting another fluid to flow from another of said inlet headers without admixture with the first mentioned fluid, through any other of the said pipes to another of said outlet headers.

3. An improved condensing and cooling apparatus comprising a multiplicity of inlet headers and a multiplicity of outlet headers interconnected by a multiplicity of pipes, each of said pipes having valves interposed therein posterior to said inlet headers and anterior to said outlet headers, said valves being so disposed as to permit one fluid to flow from one of said inlet headers through any of said pipes to one of said outlet headers, while at the same time permitting another fluid to flow from another of said inlet headers through any other of the said pipes to another of said outlet headers, thereby preventing admixture of the separate fluids, and means for contacting a cooling fluid with said pipes.

4. An improved condensing and cooling apparatus comprising a multiplicity of inlet headers and a multiplicity of outlet headers interconnected by a multiplicity of pipes in parallel, each of said pipes having valves disposed therein, so as to form together with said headers a multiplicity of separate condensing or cooling devices.

5. An improved condensing and cooling apparatus comprising a multiplicity of inlet headers, a multiplicity of outlet headers interconnected by a multiplicity of pipes in parallel, each of said pipes having valves disposed therein so as to form together with said headers, a multiplicity of separate condensing devices, and means for applying a common cooling or condensing medium to said pipes.

In testimony whereof, I hereto affix my signature.

WILLIAM H. CREEL.